(12) United States Patent
Alfonso et al.

(10) Patent No.: US 11,608,450 B2
(45) Date of Patent: Mar. 21, 2023

(54) PROCESS FOR A CONTINUOUS REACTION WITH FEEDSTOCKS DERIVED FROM BIO-RENEWABLE RESOURCES

(71) Applicant: Kraton Polymers LLC, Houston, TX (US)

(72) Inventors: Nicolas Alfonso, Savannah, GA (US); Carl Irvine, Savannah, GA (US); H. Jerrold Miller, Savannah, GA (US); David H. Sullivan, Savannah, GA (US)

(73) Assignee: KRATON CORPORATION, Houston, TX (US)

( * ) Notice: Subject to any disclaimer, the term of this patent is extended or adjusted under 35 U.S.C. 154(b) by 467 days.

(21) Appl. No.: 16/945,844

(22) Filed: Aug. 1, 2020

(65) Prior Publication Data

US 2021/0032500 A1 Feb. 4, 2021

Related U.S. Application Data

(60) Provisional application No. 62/881,635, filed on Aug. 1, 2019.

(51) Int. Cl.
| | | |
|---|---|---|
| *C08G 63/00* | (2006.01) | |
| *C09F 1/04* | (2006.01) | |
| *C08G 69/28* | (2006.01) | |
| *C08G 63/48* | (2006.01) | |
| *C08F 8/14* | (2006.01) | |

(52) U.S. Cl.
CPC .............. *C09F 1/04* (2013.01); *C08F 8/14* (2013.01); *C08G 63/00* (2013.01); *C08G 63/48* (2013.01); *C08G 69/28* (2013.01)

(58) Field of Classification Search
CPC . C08G 63/00; C08G 63/48; C09F 1/04; C08F 8/14
See application file for complete search history.

(56) References Cited

U.S. PATENT DOCUMENTS

| | | | |
|---|---|---|---|
| 3,778,394 | A | 12/1973 | Lovald et al. |
| 4,172,070 | A | 10/1979 | Epstein et al. |
| 4,578,449 | A | 3/1986 | Mobley |
| 5,138,027 | A | 8/1992 | Van |
| 5,245,057 | A | 9/1993 | Shirtum |

FOREIGN PATENT DOCUMENTS

| | | | |
|---|---|---|---|
| JP | WO 2015147298 | * | 10/2015 |
| WO | 1999055457 | A1 | 11/1999 |
| WO | 2003057818 | A1 | 7/2003 |
| WO | 2008122812 | A2 | 10/2008 |
| WO | 2014179064 | A1 | 11/2014 |
| WO | 2015075458 | A1 | 5/2015 |
| WO | 2016009177 | A1 | 1/2016 |

* cited by examiner

*Primary Examiner* — Gregory Listvoyb

(57) ABSTRACT

A process for a continuous condensation reaction with feedstocks derived from bio-renewable resources, e.g., pine chemical derived feedstock, is disclosed. The process employs at least a multi-stage mixing reactor, selected from any of a multi-stage continuous stirred tank reactor (CSTR), a multi-stage horizontal continuous stirred tank reactor (HCSTR), or a continuous oscillating baffle reactor (COBR). The multi-stage mixing reactors are provided with a plurality of baffles for creating a mixing in a number of stages or cells created by the baffles, allowing the condensation reaction to proceed at a production rate at least twice that of a batch process with reactors of equivalent volume. The feedstocks derived from bio-renewable resources is selected from gum rosin, wood rosin, tall oil rosin and mixtures thereof; and polymeric fatty acids derived from bio-renewable resources such as tall oil.

20 Claims, 2 Drawing Sheets

PROCESS FOR A CONTINUOUS REACTION WITH FEEDSTOCKS DERIVED FROM BIO-RENEWABLE RESOURCES

RELATED APPLICATIONS

This application claims priority from U.S. Provisional Application No. 62/881,635, with a filing date of Aug. 1, 2019, the entire disclosures of which is incorporated herein by reference for all purposes.

FIELD

This disclosure relates to a continuous condensation reaction with feedstocks derived from bio-renewable resources, such as tall oil derived from pine trees.

BACKGROUND

Manufacturing of chemicals derived from bio-renewable resources, such as tall oil, often have high melt-point reactants, e.g., gum rosins, wood rosins, tall oil rosins, and tall oil fatty acid (TOFA) derivatives, which, when used as a feedstocks to condensation reactions, require large-volume reactors and high temperatures to keep the reactants non-viscous with the release of water or alcohol as by-products. In order to obtain high conversions, the pine chemical industry typically uses multiple large batch reactors running in parallel to meet production demand.

There is a need for a more efficient continuous process to carry out condensation reactions with bio-renewable feedstocks derived from sources such as tall oil.

SUMMARY

In one aspect, the disclosure relates to a continuous process for reactions of viscous pine-chemical derived feedstocks. The process comprises the steps of: mixing a first feed stream comprising a bio-renewable derived feedstock and a second feed stream comprising at least one of a polyhydric alcohol, an alkylene diamine, and an alkylene polyamine; and reacting the mixture at a temperature ranging from about 180° to about 300° C. in a continuous reactor for the reaction to proceed generating a multi-phase fluid. The reactor for use with the process is provided with at least an inlet port for the feedstock in one end of the reactor, an outlet port at an opposite end of the reactor for withdrawal of liquid products, and at least a vapor outlet on top the reactor for removal of gaseous products. The reactor also has a plurality of baffles positioned along a length of the reactor, for creating a plurality of reaction stages within the reactor. The reactor is also provided with at least an agitator having a plurality of impeller stages distributed around a shaft, or a pump selected from any of diaphragm pumps, injector pumps, bellow pumps, or piston pumps, for mixing the multi-phase fluid within each reactor stage by oscillating or mixing actions. During the continuous reaction process, as the multi-phase fluid travels to the outlet port by the action of the feed pump, intense mixing is created within the plurality of reaction stages. The reactor is provided with means to remove water vapor from at least some of the stages allowing the reaction to reach a final reaction conversion of at least 80%.

DESCRIPTION

Figure 1:
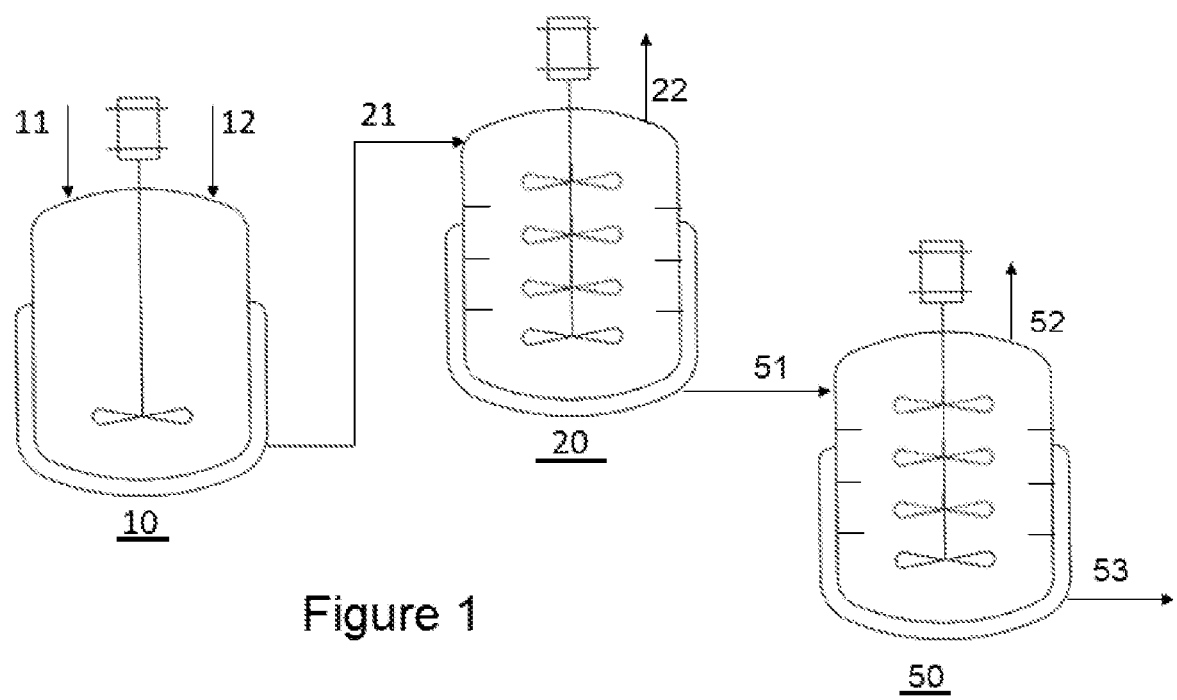
FIG. 1 is a schematic diagram showing an embodiment of a reactor system for a continuous process employing at least a pine-chemical derived feedstock, with two multi-stage radial mixing reactors.

The disclosure relates to a continuous process for condensation reactions of viscous pine-chemical derived feedstocks, for a high conversion of at least 80% and more than twice the maximum production rate compared to a reoccurring batch process. The process employs a reactor system having at least one continuous stirred tank reactor designed for multistage mixing.

"Baffles" refer to obstructions in the flow path of a fluid in the tank to deflect and disrupt the fluid flow, thus changing the direction of the flow. Baffles may fully or partially obstruct the cross-section of the tank. In embodiments, baffles are partitions or plates extending away from a wall of a tank into the center of the tank. In embodiments, each baffle may include one or more orifices for the passage of fluid.

Pine-Chemical Derived Feedstocks & Reactions:

Depending on the end-products, at least one of the feed is a pine chemical composition or derived from pine chemicals. Such pine chemical derived feedstocks are characterized as being viscous materials in liquid form. The reactions with at least a pine chemical derived feedstock may be characterized as a condensation process.

The term "pine chemical" typically refers to two main classes of chemical entities produced by pine trees, viz. turpentines and pine resins, obtained by tapping from pine trees in particular species of *Pinus*, from extraction of aged pine stumps, or can be collected in the Kraft paper pulping process as crude sulfate turpentine (CST) and crude tall oil (CTO).

In embodiments, the feedstock is selected one or more compounds of the formula R1-COOH, where R1 is (i) a linear or a branched hydrocarbon chain having at least 4 carbon atoms and one or more C=C groups; or (ii) one or more fused-ring C20 compounds having one or more carboxylic acid groups and one or more C=C groups.

In embodiments, the feedstock is selected from the group consisting of tall oil fatty acids (TOFA), resin acids (or rosin), and mixtures thereof. TOFA refers to one or more compounds of the formula R1—COOH wherein R1 is a hydrocarbon having at least 4 carbon atoms and the —COOH group is an acid group. R1 may be substituted with one or more hydroxyl groups, e.g., a hydrogen atom in R1 may be replaced with a hydroxyl (—OH) or C=C group. Rosin refers to natural mixture of resin acids and other impurities. Resin or rosin acids are $C_{20}$ fused-ring monocarboxylic acids containing double bonds that vary in number and location. Examples include abietic acid, neoabietic acid, dehydroabietic acid, dihydroabietic acid, pimaric acid, levopimaric acid, sandaracopimaric acid, isopimaric acid, and palustric acid.

In one embodiment of a process for making rosin esters, rosin is esterified with a polyhydric alcohol, typically in the presence of a catalyst, basic or acidic, such as arylsulfonic acid, at a temperature between 180° C. and 300° C., in an inert atmosphere such as nitrogen purge, for a period from 2 to 24 hours. Any rosin can be employed, e.g., gum, wood, and tall oil rosin, obtained from distillation of crude tall oil (CTO) with 70-90% acidic material composed of fatty acid and rosin. Examples of polyhydric alcohols include, but are not limited to, pentaerythritol, dipentaerythritol, tripentaerythritol, trimethylolethane, trimethylolpropane, and mixtures thereof. In embodiments, the primary polyhydric alcohol is selected from glycerol, diethylene glycol, triethylene glycol, and mixtures thereof. The polyhydric alcohol is present in an equivalent or excess of up to about 35% with respect to the rosin.

In an embodiment of a process to make polyamide, the polyamide is prepared from a first feedstock comprising a tall oil fatty acid, or an acid derived from tall oil, e.g., poly-acids such as dimer acids, trimers, or mixtures, and the second feedstock containing an amine component, alkylene diamine and alkylene polyamine such as ethylene diamine and a polyalkylene polyamine, such as diethylene triamine, and mixtures. The dimer acid typically has a dimeric content of greater than 70% with residual amounts of monomer and trimer. The amine component is typically employed in an amount essentially equal to carboxyl or acid equivalent of the acid component. The time and reaction temperature is typically from 100° C. and 300° C., or 150° C. and 300° C. for a period of from ½ to about 15 hours, for the condensation reaction to affect amidification of the acid and amine components to provide the polyamide reaction product.

It should be noted that the feedstock streams can comprise additional components known in the art for condensation reactions with pine-chemical derived feedstocks, e.g., catalysts, antioxidants, etc. In embodiments, the feedstocks further include other components for the making of modified products. In embodiments, the first feedstocks comprise a rosin acid and a dienophile selected from maleic anhydride, fumaric acid, itaconic acid, acrylic acid, formaldehyde, and mixtures thereof. In embodiments, the first feedstocks comprise a functionalized resin acid, e.g., a rosin adduct, formed by the reaction between a dienophile and a rosin.

In embodiments, the second feedstocks comprise a polyfunctional alcohol and components such as polymer-based material, e.g., an acrylic containing polymer for the formation of a hard rosin ester. Typical acrylic-containing polymers include a polymer mixture of acrylic acid, methacrylic acid, or one or several of their organic ester derivatives, and a member selected from the group consisting of styrene alpha methyl styrene, ethylene vinyl acetate, and a combination thereof.

Reactor System:

The reactor system disclosed herein allows continuous industrial production of viscous products from pine-chemical derived feedstock, with a maximum production rate at least twice as much as it would be using batch reactors of equivalent volume. The feedstocks, e.g., pine-chemical derivatives such as organic acid, polyol, amines, etc., are premixed in a mixing tank (a CSTR), and fed into at least a multi-stage reactor with each stage being well mixed, e.g., any of a multi-stage continuous stirred tank reactor (CSTR), a multi-stage horizontal continuous stirred tank reactors (HCSTR), or a multi-stage continuous oscillating baffle reactor (COBR). The multi-stage mixing reactors are provided with a plurality of baffles, e.g., at least 4, or at least 6, or between 6 to 20, or less than 20.

In embodiments, the reactor system comprises multiple multi-state reactors in series or in parallel, with a portion of the feedstock mixture from the mixing tank and/or a portion of the liquid products from the first multi-stage reactor being provided as the feedstocks for the subsequent multi-stage reactor(s) in series or in parallel.

CSTR Pre-Mixing Tank:

The pre-mixing in a mixing tank (a CSTR) can be operated in any of batch, semi-batch, or continuous mode, and preferably in continuous mode. The impeller in the mixing tank can be designed to produce either laminar (viscous) or turbulent flow, depending on the feedstock type/end-product of the condensation reaction. In one embodiment, the impeller is of the axial flow type, meaning a relatively low shear rate, for the movement of the mixture in an axial or substantially axial direction, along a vertical or substantially vertical direction, either upwards or downwards, while still ensuring substantial circulation of the liquid mixture and consequently sufficient mixing capacity. For axial flow, the impeller can be of any type including but not limited to inclined-blade turbine impellers and single-, double- or triple-helical ribbon stirrers.

In one embodiment, the impeller in the mixing tank is of a laminar ribbon impeller type with a diameter of at least 50% the diameter of the mixing tank. A large impeller aids in the transport/mixing of viscous fluids such as pine-chemical derivative feedstocks. In another embodiment, the impeller of the mixing tank is of a turbulent type, allowing either axial or radial flow mixing, with either disk type flat or curved blade turbines for radial mixing, or propeller/pitched blades for axial flow mixing.

In one embodiment, the mixing tank operates at a temperature ranging from 100° C. to 250° C., depending on the pine-chemical derivative feedstock, a sufficient temperature to allow the reactants to be mixed but not sufficient for the reaction to progress. In embodiments, the mixing tank operates at a temperature of at least 50° C. lower than the temperature of the multi-stage CSTR(s), multistage HCSTR(s), or the COBR(s) in the reactor system.

Multi-Stage Reactor:

The multi-stage radial mixing reactor can be any of continuous multi-stage CSTR(s), continuous multi-stage horizontal CSTR(s) (or HSTR(s)), or multi-stage COBR(s). In embodiments, the multi-stage reactor is a CSTR with at least an agitator, in the form of a multi-stage impeller having at least two stages of impeller blades axially distributed along a shaft, creating a well-mixed zone. The impeller blades can be any of disc turbine "Rushton" type, or straight, pitched or curved blades. In embodiments, the total impeller diameter ranges from ¼ to ¾ of the inner diameter of the reactor vessel, or ¼ to ½ of the vessel diameter, or 25-50% of the vessel diameter.

The CSTR further comprises a plurality of baffles (partition plates) arranged perpendicular to the shaft, functioning to separate the impeller stages, creating a multi-stage CSTR and promoting mixing. In operation, the baffles create multiple zones for the condensation reaction, allowing the melt to flow from one zone (or stage) to the next, so that the reactor performs like several smaller reactors in series. The baffles can be in the form of meshed screens, or other configurations such as perforated disks, or punched sheets of metal, or annular rings positioned along the vertical length of the CSTR.

The multi-stage CSTR is vertical, e.g., substantially cylindrically shaped, with the height of the cylinder defining the vertical axis of the vessel, perpendicular to the ground on which it is placed, and the diameter defining the horizontal axis, parallel to the ground. The vessel is provided with a plurality of injection ports for the feedstock at the top of the CSTR, and outlet for the discharge of the products/effluents from the bottom. The vessel is further provided with at least one outlet at the top of the reactor for the removal of gaseous products. In embodiments, the injection ports are at the bottom of the reactor, and with the product take-off ports being positioned at the top of the reactor.

In other embodiments, the multi-stage mixing reactor is a multi-stage horizontal flow reactor (cylindrical pipe reactor), with a multi-stage impeller having at least two stages of impeller blades axially distributed along a horizontal shaft, creating well mixed zones. The shaft of the impeller can be at the center of the cylindrical pipe reactor, or it can be off-centered.

The multi-stage horizontal continuous stirred tank reactor HCSTR further comprises a plurality of baffles, or partitions positioned along the horizontal length of the reactor (the cylindrical pipe). The baffles are partial baffles (not extending covering the full circumference of the reactor or not fully annular), with each baffle covering at least one half the sectional area of the reactor. In embodiments, the baffles are of varying heights with the height descending along the fluid pathway (from inlet to outlet or from the inlet end of the pipe to the outlet end). The baffles are provided with free open area of at least 10% of the internal sectional area of the pipe reactor. In other embodiments, the baffles are of the same height, with the reactor shell being pitched down from the inlet to the outlet to allow the fluid to cascade from one stage to the next.

The multi-stage HCSTR is provided with at least an inlet port at one end of the cylindrical pipe and an outlet port at the other end of the pipe reactor. The reactor is further provided with at least one outlet at the top (and opposite end of the inlet port) for the removal of the gaseous products.

In operations, the multi-stage impeller (of a multi-stage CSTR or HCSTR) rotates at a rate (rpm) that provides uniform mixing in the reactor stages. In embodiments, the impeller operates at a speed ranging from 5 to 80 rpm, or 10-60 rpm, or 15-50 rpm, while keeping a clearance between the inner wall of the reactor and agitation blades.

In yet other embodiments, the multi-stage mixing reactor is a continuous oscillating baffle reactor (COBR). The COBR can be a horizontal tank (or pipe) with periodic constriction baffles positioned along the horizontal length of the COBR. The baffles are in of annual shape covering the full sectional area of the pipe reactor, having an orifice in the center for fluid flow. As the multi-phase fluid is alternately pushed forward and backward (reverse) through the baffle orifice, from one end of the reactor to the other, eddies are created between the baffles with the oscillating pulsing action, creating effective mixing and with each baffled cell or stage acting as a CSTR.

The multi-phase fluid of the condensation reaction is oscillated in the axial direction through the orifices in the baffles by means of at least a pump, e.g., diaphragms, injectors, bellows, or pistons, at one or both ends of the pipe reactor, with the oscillatory motion of the pump superimposed upon the net flow of the process fluid. The combination of the baffles and the oscillatory motion creates an efficient mixing mechanism conducive to efficient heat and mass transfer in the reactor system. In one embodiment with two pumps, one is reciprocating to generate continuous oscillatory flow, and the second pump creates net flow through the pipe reactor. The COBR can be connected to a central processing unit (CPU) which control the frequency and/or amplitude of oscillation.

In one embodiment, each baffle is provided with a center orifice. In other embodiments, each baffle is provided with a plurality of orifices with the orifices lining up in a straight line. The use of multi-orifice baffles allows for the generation of microbubbles as the fluid oscillates relative to the baffle, generating strong mixing due to the fluid pulsation.

Reactor Operation & Yield:

The multi-stage mixing reactor can be operated in semi-batch mode or continuous mode, and preferably in continuous mode in a uniaxial vertical agitation reactor, allowing excellent conversion rate. With the multi-stage reactor, the conversion rate is a function of the total volume and number of stages.

The multi-stage radial mixing reactor is typically run at a sufficient temperature for the reaction to go to at least 80% conversion (with a single multi-stage reactor), or at least 90% conversion (with multiple multi-stage reactor). The practical limitation of the number stages that can be accommodated in a single multi-stage reactor is the effectiveness of water removal and the resultant approach to reaction equilibrium.

The operating temperature depends on a number of factor, including but not limited to the feedstock/desired end-product, a tradeoff between shorter reaction time, and undesired side reactions e.g., decarboxylation, color darkening, yield loss due to volatilization, etc. In embodiments, the operating temperature ranges from 230-300° C., or 250-275° C., or less than 320° C., or at least 200° C. for rosin esters and polyamides, and a lower temperature, e.g., below 150° C.

In embodiments with the use of a pre-mixing tank and a multi-stage mixing reactor system with a residence time of less than 15 hours (reaction time), a conversion of at least 90% is obtained as opposed to at least 24 hours (total batch time) in the prior art with batch reactors. In one embodiment, a conversion of at least 90% is obtained with one multistage radial mixing reactor and one single CSTR in series, with a production rate at least 1.5 times the rate of two batch reactors of equivalent volume. In yet another embodiment with two multistage radial mixing reactors in series, over 92% conversion is obtained with a production rate of at least 2.0 times the rate of two batch reactors of equivalent volume.

The disclosure can be further illustrated by the Figures. No auxiliary pieces of equipment such as heat exchangers, condensers, pumps and compressors are shown, as they are not essential to the disclosure.

FIG. 1 illustrates an embodiment of a reactor system with multi-stage CSTRs. Feedstock to mixing tank 10 includes feed stream 11 for feedstock components such as alcohol, amine component and the like, and feed stream 12 for the pine-chemical derived feedstock such as dimer acids, rosin acids, etc. Mixing tank 10 is equipped with an impeller for the mixing of the feedstocks prior to the condensation reaction in multi-stage CSTR 20 and/or 50.

As shown, effluents 51 containing reaction products from multi-stage CSTR 20 are collected and sent to the second multi-stage CSTR 50 in series for additional reaction. End-product stream 53 is directed to storage, or further processing, e.g., fractionation. Gaseous products are removed from the reactor system via outlet streams 22 and 52.

In embodiments (not shown), there are additional feed streams for the addition of solvents, additives and catalyst(s) to the mixing tank 10 and reactors 20 and 50. Although not shown, the feed stream inlet can be to the bottom zone of the multi-stage CSTR, wherein the feed passes upwards through the multi-stage CSTR with the product or effluent exiting the multi-stage CSTR from the top zone. Additionally (and not shown), catalysts, solvents, additives, and some of the feed from feed stream 11 and/or feed stream 12 can be diverted or directed to the second multi-stage CSTR 30 to continue with the reaction for increased conversion.

In some embodiments (not shown) additional multi-stage CSTRs are employed, either as back-up reactors, or as reactors in series for increased residence time and higher conversion rate. The condensation reaction is best operated continuously with the reactor system as illustrated in FIG. 1, or it can be conducted in a semi-batch fashion with intermittent feed, and the product is discharged intermittently.

Figure 2:
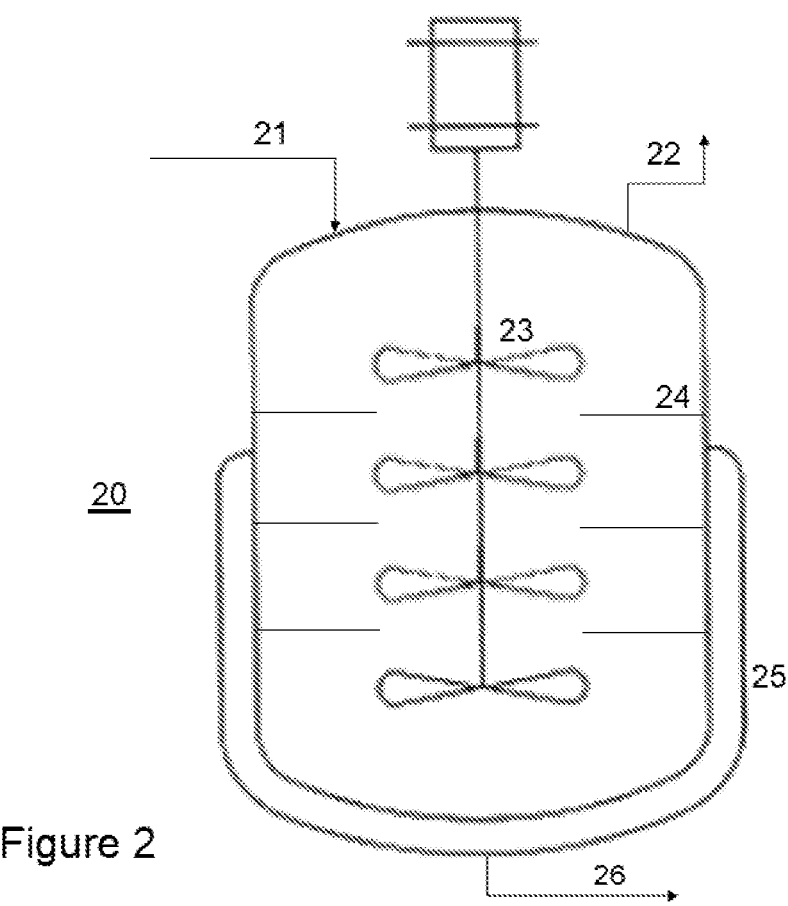
FIG. 2 is a side view showing an embodiment of a multi-stage radial mixing reactor.

FIG. 2 illustrates an embodiment showing the internals of multi-stage CSTR 20. Agitator 23 is a multi-stage mixer with a plurality of impellers. Although the reactor 20 is shown with two blades for each impeller stage, it should be noted that more than two blades can be used, or other agitation designs can be employed. A plurality of (horizontal) baffles 24 aid in/create the stage separation. Heater 25 is a heat source applied to the reactor, including but not limited to: a heating jacket, heating coils, or electric lining. Feedstock enters the reactor from the top inlet 21 and move downward in the reactor. Reactor output includes reaction condensate removed from the top of the reactor via outlet port 22 and end-product removed from bottom outlet 26.

Figure 3:
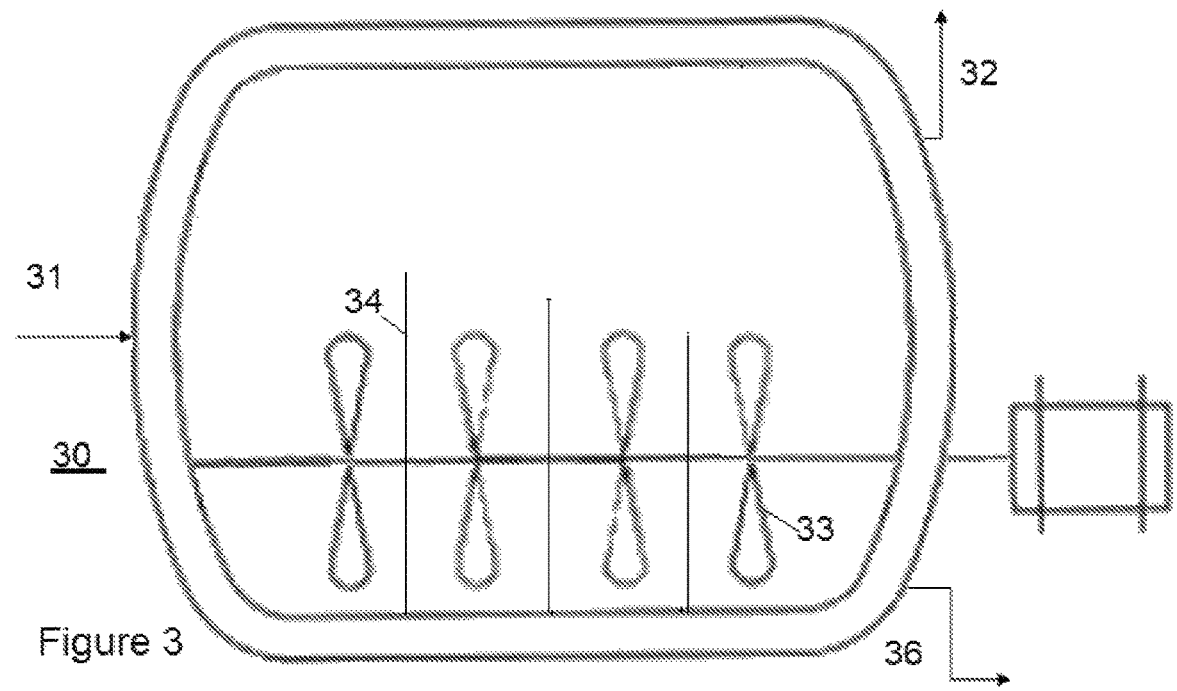
FIG. 3 is a side view showing a second embodiment of a multi-stage mixing reactor in the form of a horizontal flow reactor equipped with baffles and an agitator.

FIG. 3 illustrates an embodiment where the multi-stage radial mixing reactor is a horizontal continuous stirred tank reactor (HCSTR) 30. The multi-stage PFR is provided with an agitator with a plurality of impeller blades 33. A number of cascading baffles 34 are positioned vertically along the length of the reactor 30, creating stage separation between the impeller blades, with the baffles being of descending height from one end of the reactor (feed inlet 31) to the other end (product outlet port 32). The reactor is provided with outlet port 32 for the removal of gaseous products. In some embodiments (not shown) the baffles may be the same height, but the vessel is raised at the inlet to allow the fluid to cascade from stage to stage in the direction of the outlet.

Figure 4:
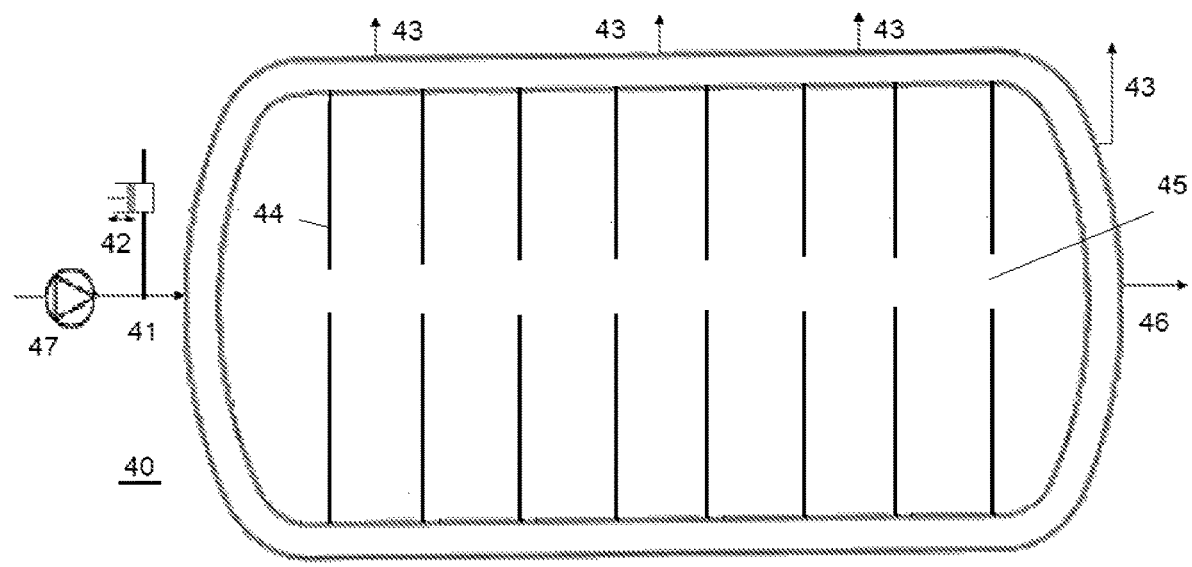
FIG. 4 is a side view showing a third embodiment of a multi-stage mixing reactor in the form of a continuous oscillating baffle reactor.

FIG. 4 illustrates an embodiment where the multi-stage radial mixing reactor 40 is continuous oscillating baffle reactor (COBR) 40, with a number of annular baffles 44 located along the length of the reactor. Feedstock is pumped via feed pump 47. Pulsating pump 42 applies pulsation to oscillate the feedstock flow through inlet port 41 into the reactor 40. Each baffle 44 is provided with a central orifice 45 through which the multi-phase fluid "oscillates" through, creating eddies on both sides of the baffles. The reactor 40 is provided with a plurality of outlets 43 at the top of the baffled cells for the release or removal of gaseous products, e.g., water. Reaction product is removed via outlet port 42.

Although not shown in the Figures, in order to control the heat generated by an exothermic reaction a cooling system may be provided. In embodiments, the cooling system comprises a plurality of tubes for passing cooling fluid to cool down the reactor system.

Examples

The disclosure will be further clarified by the following examples.

Computer based modeling is used to model a batch process and a continuous process for making rosin esters. The rosin ester is produced from condensation reaction of tall oil rosin and pentaerythritol to make a mix of pentaerythrityl tri-abietate and pentaerythrityl tetra-abietate. Pentaerythritol will be abbreviated as PE and in general, a rosin acid will be abbreviated as RA. In order for this reaction to occur, high temperatures are required not only to keep the reactants molten, but also to solvate the pentaerythritol in the rosin. Abietic acid is the most common rosin acid in tall oil. The product of each addition of abietic acid to pentaerythritol will be called monoester, diester, triester, and tetraester.

There are three byproduct streams from the reaction: rosin process oil (RPO), oily water, and off-gas. RPO is vacuum stripped from the batch during reaction and consists of decarboxylated rosin, fatty acids, and other organic material with a boiling point above 100° C. The water stream contains mostly water with light oils that have boiling points below 100° C. Finally, the off-gas consists of mostly carbon dioxide along with propane, methane, ethane, and hydrogen.

Batch Process Modeling:

The batch reactor has separate pentaerythritol and rosin inlets. The batch reactor is also provided with steam sparge rings, nitrogen blanket systems, and heating coils. The batch reactor has a primary condenser where RPO is collected, and a secondary condenser where water is collected.

The batch process includes the following: 1) charging the reactor with rosin feed while pulling a vacuum of about −1 psig; 2) start agitator and set temperature to 190° C.; 3) add catalyst to the batch reactor; 4) add pentaerythritol to reactor; 5) set reactor temperature to 280° C.; 6) apply full vacuum at −10 psig; 7) after product specification is met, reactor will start to cool and release vacuum to −5 psig; and 8) discharge product to hold tank.

For the computer model, the following reaction is proposed, with triesters form an ether linkage between the two alcohol groups on the pentaerythrityl moieties:

The following list of assumptions is used in the computer model:

Constant temperature

All water and gases including $CO_2$ are insoluble and removed completely

All rosin acids assumed to behave the same;

No rosin or PE vaporization (refluxed back to reactor)

No reaction in vapor phase

Insignificant enthalpy of reaction

Density is constant throughout reaction

Reaction rates are not significantly affected by pressure profile in reactor.

Using this model with $\Delta t=1.5$ min, all components are calculated over a reaction time of 10 hours. The rate constants are calculated by minimizing the sum of square residuals between the model and experimental GPC data. The rate constants are calculated at 270° C. and 285° C. in order to further calculate the activation energy and pre-exponential coefficient of the Arrhenius equation for each reaction. Batch reaction modeling results are shown in FIG. 5, with the component concentration over time.

Continuous Process Modeling:

For the continuous process, the reactor system consists of a mixing tank, 2 multi-stage reactors with each reactor provided with a uniaxial agitator with 4 impeller stages. The reactor volume is calculated by finding a relationship between the reactant consumption rate and the conversion, then using a Levenspiel plot.

The continuous process starts by mixing the rosin with PE and catalyst in a mixing tank at about 200° C. to mix the PE and rosin, but cold enough to have insignificant reaction. The feed mix is heated to 280° C. prior to entering the first multi-stage reactor, where a rosin conversion of ~80% is reached and most of the water and carbon dioxide is released. The second reactor finishes the reaction by reaching a conversion of 92%. Both reactors use reflux condensers designed such that only water and light hydrocarbons pass through, according to Levenspiel model.

For the same production rate as 4 batch reactors, only 2 reactors are needed for the continuous process, with total residence time of 20 hours. This compares with 4 batch reactors with total cycle time of 35 hours from start to finish (for a reaction time of 10 hours). The net heat demand of the continuous process is estimated to be 111 BTU/lb of rosin ester produced, compared to 524 BTU/lb rosin ester for a batch process, including only the batch heating, steam sparge, and steam vacuum system.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A process for a continuous reaction with at least a feedstock derived from bio-renewable resources, which comprises:
   providing a first feedstock derived from bio-renewable resources selected from one or more compounds of the formula R1—COOH, wherein R1 is
   (i) a linear or a branched hydrocarbon chain having at least 4 carbon atoms and one or more C=C groups; or
   (ii) one or more fused-ring C20 compounds having one or more carboxylic acid groups and one or more C=C groups;
   providing a second feedstock comprising at least one of a polyhydric alcohol, an alkylene diamine, and an alkylene polyamine;
   mixing the first feedstock and the second feedstock in a mixing tank;
   reacting the mixture at a temperature ranging from about 180° to about 300° C. in a reactor system comprising at least a continuous reactor for the reaction to proceed generating a multi-phase fluid;
   wherein the continuous reactor is provided with:
      at least an inlet port for the feedstock in one end of the reactor, an outlet port at an opposite end of the inlet port for withdrawal of liquid products, and at least a vapor outlet on top of the reactor for removal of gaseous products,
      a plurality of baffles positioned along a length of the reactor, for creating a plurality of reaction stages within the reactor;
      an agitator having a plurality of impeller stages distributed around a shaft, for providing mixing action, or a pump selected from any of diaphragm pumps, injector pumps, bellow pumps, or piston pumps for moving the multi-phase fluid alternately forward and reverse through the baffles providing oscillating pulsing action;
   wherein during the continuous reaction process, as the multi-phase fluid travels from the inlet port to the outlet port by oscillating pulsing action of the pump or mixing action of the agitator, mixing is created within the plurality of reaction stages for a final reaction conversion of at least 80%.

2. The process of claim 1, wherein the reactor is provided with an agitator having a plurality of impeller stages distributed around a shaft for creating independent mixing zones in the reaction stages created by the baffles within the reactor.

3. The process of claim 1, wherein the reactor is provided with a pump selected from any of diaphragm pumps, injector pumps, bellow pumps, or piston pumps, for moving the multi-phase fluid alternately forward and reverse through the baffles providing oscillating pulsing action, creating independent mixing zones in the reaction stages created by the baffles within the reactor.

4. The process of claim 3, wherein the reactor is provided with a diaphragm pump for generating oscillating actions in the multi-phase fluid.

5. The process of claim 1, wherein the reactor is a vertical agitation reactor having a vertical length and an agitator,
   wherein the agitator is a uniaxial agitator having a plurality of stages of impeller blades axially distributed along a central shaft,
   wherein the baffles are horizontal baffles positioned along the vertical length of the reactor for separating the plurality of impeller stages into multiple continuous stirred reaction zones.

6. The process of claim 1, wherein the reactor is a horizontal continuous stirred tank reactor having a horizontal length and a cross sectional area and an agitator,
   wherein the agitator is a uniaxial agitator having a plurality of stages of impeller blades axially distributed around a central shaft across the horizontal length;
   wherein the baffles are cascading vertical partial baffles positioned along the horizontal length, with each baffle having a height covering at least one half of the cross sectional area, and wherein the cascading baffles have decreasing heights from the inlet port to the outlet port.

7. The process of claim 1, wherein the reactor is an oscillating baffle reactor having a horizontal length, a cross sectional area, and at least a diaphragm pump, superimposing alternately forward and reverse flow resulting in oscillating action of the multi-phase fluid;
   wherein the baffles are annular constriction baffles positioned along the horizontal length of the reactor, with each baffle having at least a center orifice for the multi-phase fluid to flow through, creating eddies in the reaction stages with the oscillating action of the multi-phase fluid;

wherein the reactor is provided with a plurality of exit ports in between the baffles for removal of gaseous products.

8. The process of claim 1, wherein the continuous reaction is for making rosin esters, and wherein:
the first feedstock is a rosin acid,
the second feedstock is a polyhydric alcohol.

9. The process of claim 8, wherein the second feedstock is selected from pentaerythritol, dipentaerythritol, tripentaerythritol, trimethylolethane and trimethylolpropane, glycerol, diethylene glycol, triethylene glycol, and mixtures thereof.

10. The process of claim 1, wherein the continuous reaction is for making a polyamide, and wherein:
the first feedstock is a tall oil fatty acid or a polyacid;
the second feedstock is any of an alkylene diamine and an alkylene polyamine.

11. The process of claim 10, wherein:
the second feedstock is selected from ethylene diamine, diethylene triamine, hexamethylene diamine, piperazine, 1,3-propane diamine, polyetheramine and mixtures thereof.

12. The process of claim 1, wherein
the first feedstock comprises a rosin acid and a dienophile selected from maleic anhydride, fumaric acid, itaconic acid, acrylic acid, formaldehyde, and mixtures thereof.

13. The process of claim 1, wherein the first feedstock comprises a functionalized resin acid.

14. The process of claim 1, wherein the first feedstock comprises a rosin acid and a dienophile selected from maleic anhydride, fumaric acid, itaconic acid, acrylic acid, formaldehyde, and mixtures thereof.

15. The process of claim 1, wherein the second feedstock comprises a polyfunctional alcohol and components such as polymer-based material.

16. The process of claim 1, wherein the first feedstock derived from bio-renewable resources comprises one or more compounds having formula R1-COOH where R1 is a linear or a branched hydrocarbon chain having at least 4 carbon atoms and one or more C=C groups.

17. The process of claim 1, wherein the first feedstock derived from bio-renewable resources comprises one or more compounds having formula R1-COOH, where R1 is one or more fused-ring C20 compounds having one or more carboxylic acid groups and one or more C=C groups.

18. The process of claim 1, wherein the first feedstock derived from bio-renewable resources is selected from gum rosin, wood rosin, tall oil rosin and mixtures thereof.

19. The process of claim 1, wherein the first feedstock derived from bio-renewable resources is selected from polymeric fatty acids.

20. The process of claim 1, wherein the reactor system comprising at least two continuous reactors in series or in parallel, a first continuous reactor and a second continuous reactor, wherein a portion of the mixture of the first feedstock and the second feedstock or at least a portion of the liquid products is provided as feedstocks to the second continuous reactor.

* * * * *